(12) United States Patent
Eyraud

(10) Patent No.: US 11,448,295 B2
(45) Date of Patent: Sep. 20, 2022

(54) LINEAR ACTUATOR, HOUSING FOR A LINEAR ACTUATOR, ACTUATION SYSTEM AND ASSEMBLY METHOD

(71) Applicant: Ewellix AB, Goeteborg (SE)

(72) Inventor: Emmanuel Eyraud, Liestal (CH)

(73) Assignee: Ewellix AB, Goeteborg (SE)

( * ) Notice: Subject to any disclaimer, the term of this patent is extended or adjusted under 35 U.S.C. 154(b) by 0 days.

(21) Appl. No.: 17/373,990

(22) Filed: Jul. 13, 2021

(65) Prior Publication Data

US 2022/0010865 A1 Jan. 13, 2022

(30) Foreign Application Priority Data

Jul. 13, 2020 (DE) .................... 102020118449.2

(51) Int. Cl.
*F16H 25/20* (2006.01)

(52) U.S. Cl.
CPC ..... *F16H 25/20* (2013.01); *F16H 2025/2031* (2013.01); *F16H 2025/2081* (2013.01); *F16H 2025/2096* (2013.01)

(58) Field of Classification Search
CPC ..... F16H 2025/2096; F16H 2025/2081; F16H 2025/2031; F16H 25/20
See application file for complete search history.

(56) References Cited

U.S. PATENT DOCUMENTS

| 4,137,784 A | 2/1979 | Griffin |
| 8,495,924 B2 | 7/2013 | Fukano et al. |
| 2012/0222510 A1* | 9/2012 | Winther ............... F16H 25/20 74/89.37 |
| 2014/0298980 A1* | 10/2014 | Cyren ............... F16H 25/2015 91/41 |
| 2017/0184187 A1* | 6/2017 | Tseng ................ F16H 25/20 |
| 2017/0331350 A1* | 11/2017 | Sørensen et al. ... F16H 25/2454 |
| 2018/0087634 A1* | 3/2018 | Muster ............... B64C 25/24 |
| 2019/0233054 A1* | 8/2019 | Rodgers ............... B62M 9/122 |
| 2019/0242466 A1* | 8/2019 | Brieschke ........ F16H 25/2021 |
| 2019/0368237 A1* | 12/2019 | Distefano ............ E05B 81/20 |
| 2020/0028406 A1* | 1/2020 | Gassner ............ F16H 25/2015 |
| 2020/0049236 A1* | 2/2020 | Shimizu ............... F16H 25/22 |
| 2020/0378482 A1* | 12/2020 | Blesener ............. G05B 19/416 |
| 2021/0332873 A1* | 10/2021 | Blesener ............. H02K 11/215 |
| 2022/0010865 A1* | 1/2022 | Eyraud ................ F16H 25/20 |

FOREIGN PATENT DOCUMENTS

| DE | 29701890 U1 | 3/1997 |
| DE | 102009016928 A1 | 10/2009 |

* cited by examiner

*Primary Examiner* — David M Fenstermacher
(74) *Attorney, Agent, or Firm* — Laurence A. Greenberg; Werner H. Stemer; Ralph E. Locher

(57) ABSTRACT

A linear actuator, a housing for such a linear actuator, an actuation system, and a method for assembling a linear actuator. The linear actuator has an actuating mechanism and a housing. The actuating mechanism includes a spindle and a nut and it is configured to convert rotational motion into translational motion. The housing has two housing parts and the actuating mechanism is at least partially arranged in the housing. The two housing parts form a plurality of separate cavities that are configured to receive separate components of the linear actuator, in particular of the actuating mechanism.

20 Claims, 5 Drawing Sheets

LINEAR ACTUATOR, HOUSING FOR A LINEAR ACTUATOR, ACTUATION SYSTEM AND ASSEMBLY METHOD

CROSS-REFERENCE TO RELATED APPLICATION

This application claims the priority, under 35 U.S.C. § 119, of German patent application DE 10 2020 118, 449.2, filed Jul. 13, 2020; the prior application is herewith incorporated by reference in its entirety.

BACKGROUND OF THE INVENTION

Field of the Invention

The present invention relates to a linear actuator, a housing for such a linear actuator, an actuation system, and a method for assembling such a linear actuator.

Linear actuators are used for transforming rotational motion, e.g., of a motor, into translational motion, e.g., extension or retraction of an output member such as a push tube. In order to allow a linear actuator to be used flexibly and/or to be adapted to a plurality of different tasks, such linear actuators are often designed in a modular manner. This enables a high number of variants of such a linear actuator.

However, such (modular) linear actuators may become very complex and comprise a plurality of interacting parts. Basic ball screw mechanisms, for example, already include a threaded spindle and a nut having inner raceways for a plurality of balls and a mechanism to recirculate the balls, the nut being radially arranged about the spindle. Respective bearings are usually necessary for rotationally mounting the spindle.

For the protection of these components from environmental influences, linear actuators often comprise a housing in which the actuation mechanism is arranged. The shape of these housings is often adapted to the respective variant of the linear actuator and/or the task for which the linear actuator is utilized.

BRIEF SUMMARY OF THE INVENTION

It is accordingly an object of the invention to provide a linear actuator which overcomes the above-mentioned disadvantages of the heretofore-known devices and methods of this general type and which provides for a generally improved linear actuator, in particular, that is a simplified linear actuator and/or that allows a simplified assembly of the actuator.

With the above and other objects in view there is provided, in accordance with the invention, a linear actuator, comprising:

a housing formed with two housing parts, said two housing parts forming a plurality of separate cavities configured to receive separate components of the linear actuator; and an actuating mechanism at least partially arranged in said housing, said actuating mechanism including a spindle and a nut and being configured to convert a rotational motion into a translational motion.

In other words, the objects of the invention are solved by a linear actuator, a housing for such a linear actuator, an actuation system and a method for assembling such a linear actuator according to the independent claims.

A first aspect of the invention relates to a linear actuator comprising an actuating mechanism and a housing. The actuating mechanism includes a spindle and a nut, the actuating mechanism being configured to convert rotational motion into translational motion. The housing comprises two housing parts, wherein the actuating mechanism is at least partially arranged in said housing. According to the invention, the two housing parts form a plurality of separate cavities configured to receive separate components of the linear actuator, in particular of the actuating mechanism.

A cavity formed by the two housing parts in the sense of the present invention is, in particular, a hollow space inside the housing. Therein, the plurality of cavities are preferably not closed cavities. Rather, the cavities may be connected such that the components received therein may interact with each other. Further, it is possible that some components extend through more than one cavity. For example, the spindle may reach through cavities in which bearings for rotationally mounting the spindle are located into a cavity in which the nut is located. In other words, the cavities may at least partially overlap and/or blend into one another.

An aspect of the invention is based on the approach of providing a housing for a linear actuator which comprises two housing parts, in particular two housing halves, wherein the two housing parts are preferably separable along an actuation axis of the linear actuator. Herein, an actuation axis of a linear actuator is, in particular, an axis along which a component of an actuating mechanism, e.g. a spindle or a nut, and/or an output member, e.g. a piston or rod, of the linear actuator translates. Preferably, the actuation axis also corresponds to an axis of rotation of the actuating mechanism, in particular the nut or spindle, respectively.

Further, the two housing parts are preferably configured to form a plurality of separate cavities upon assembly for receiving separate components of the linear actuator, in particular of an actuating mechanism of the linear actuator and/or of a drive unit of the linear actuator. For example, one of the cavities may receive a nut of the actuating mechanism, and another one of the cavities may receive at least a part of a spindle of the actuating mechanism. By means of the plurality of cavities which are formed by the two housing parts, it is possible to place, in particular translationally fix, at least a part of the separate components of the linear actuator without any additional fastening means or fixtures like e.g. (elastic) rings, screws, pins, spacers and/or the like, thereby simplifying the linear actuator. In other words, the cavities may act as seats for at least a part of the components. This allows for a reduction of parts of the linear actuator and/or particularly fast assembly, making the linear actuator suited for high volume production.

Preferably, the plurality of separate cavities are configured to hold, in particular at least partially enclose, separate components of the linear actuator, in particular the actuating mechanism, in place even upon operation of the linear actuator. Therein, at least a part of the cavities may allow a rotational motion of the received components. Preferably, the plurality of separate cavities are configured to place the components of the linear actuator, in particular the actuating mechanism, according to their functional relationship. For example, bearings may be arranged for rotationally mounting the spindle with respect to the housing by being received in respective cavities concentric with the spindle.

In order to achieve a particular secure seating of a component, a shape of the receiving cavity can be defined at least substantially by the shape of the component. In other words, at least a part of the cavities may be shaped according to the shape of the received components.

In the following, preferred embodiments of the invention and their modifications will be described which may be combined with each other as well as with further aspects of the invention as far as its not explicitly excluded.

In a preferred embodiment, the two housing parts comprise inner walls separating at least a part of the plurality of separate cavities. Preferably, at least a part of the inner walls is configured to translationally fix the components of the actuating mechanism received by the respective cavity. In other words, at least a part of the components may be seated by the respective cavities. Preferably, the inner walls are integral with the two housing parts. In order to allow interaction between separate components, the inner walls may comprise openings through which at least a part of the components may at least partially extend. For example, the spindle may extend from a cavity in which a bearing for rotatably mounting the spindle is located through an opening in an inner wall into a cavity in which the nut is located. By providing the inner walls, the components of the linear actuator, in particular the actuating mechanism, may be arranged in one of the housing parts in a particularly precise manner.

In another preferred embodiment, at least one of the two housing parts comprises a mating component extending in an axial direction, the mating component being configured to interact with a corresponding mating component of the nut such that the nut is rotationally fixed. The axial direction in this context relates preferably to the actuation axis of the actuating mechanism. By this means, the nut can be reliably secured against rotation without the need of any additional means.

Preferably, the mating components are complementary. For example, one of the housing parts may comprise an elongate projection extending axially inside a cavity for receiving the nut, wherein the nut may comprise a groove extending axially on an outer surface thereof. Upon assembly, the projection may be inserted into the groove to rotation lock the nut with respect to the housing while allowing axial translation of the nut. By this means, a particularly simple locking device may be realised. Further, the complementary mating components may aid in orienting the nut correctly with respect to the housing part upon assembly.

In another preferred embodiment, the linear actuator further comprises a motor coupled to the actuating mechanism, wherein at least one of the two housing parts comprises an outer protrusion for supporting a motor coupled to the actuating mechanism. In particular, the outer protrusion may be configured for supporting the motor when the motor is secured to the housing via a connecting part of the motor or via screws. By this means, load induced by the weight of the motor may be taken from the connecting part and the section of the housing to which the motor is secured if the motor is oriented horizontally.

In yet another preferred embodiment, the linear actuator further comprises a drive unit for coupling a motor to the actuating mechanism. Preferably, the drive unit comprises an input pulley engageable by a motor shaft of the motor, an output pulley coupled to the actuating mechanism, and a belt running on the input pulley and the output pulley. Herein, "engageable by a motor shaft" is to be understood as "configured to be coupled to a motor shaft". In other words, the motor shaft may be coupled to the actuating mechanism, in particular the drive unit, by coupling the motor shaft to the input pulley, e.g. by inserting the motor shaft into an axial bore of the input pulley. Preferably, the input pulley, in particular the axial bore, is configured to be rotationally coupled to the motor shaft by means of a form-fit.

In yet another preferred embodiment, the output pulley is, in particular directly, coupled to the spindle, wherein the input pulley and/or the output pulley comprises two axially extending studs. Preferably, a bearing is press-fitted onto each of the two studs for rotatably mounting the input pulley and/or the output pulley and the spindle, respectively, in the housing. In other words, the input pulley and/or the output pulley is preferably configured for carrying bearings on two axially extending studs. This allows for a particularly compact arrangement without the need for any additional fastening means.

In order to save costs and production time, the output pulley including the two studs may be fabricated by casting.

In order to allow for a particular easy assembly of the linear actuator, the drive unit, in particular the input pulley and/or the output pulley, is fixed in the housing, in particular the two housing parts, by means of separate cavities receiving the bearings press-fitted on the axially extending studs, in particular in a form-fit manner. In particular, the bearings may be form-fitted into separate cavities formed by the two housing parts.

In yet another preferred embodiment, the input pulley and/or the output pulley comprises a plurality of ribs extending axially on a circumferential surface of each of the two studs. This may simplify the press-fitting of the bearings onto the studs and/or provide for a particularly firm seat of the bearings onto the studs.

In yet another preferred embodiment, the output pulley is press-fitted onto the spindle. By this means, a particularly fast assembly without the need of additional fastening means becomes possible, and the assembled linear actuator comprises a lesser number of parts compared to conventional actuators.

Preferably, the spindle comprises a knurling, in particular in a section adjacent to the threading of the spindle. This allows for a particular secure seat of the output pulley on the spindle without the need of any additional fastening means.

In yet another preferred embodiment, the input pulley and the output pulley each comprise a pulley collar for guiding the belt, the pulley collars being arranged at opposite ends of the two pulleys. I.e. the pulley collar of the input pulley is preferably arranged at an axial end of the input pulley opposite to an axial end of the output pulley at which the pulley collar of the output pulley is arranged. In other words, the two pulley collars are arranged at respective ends of the input and output pulley which face away from each other. For example, the output pulley may comprise a pulley collar arranged at an axial end of the output pulley facing the actuating mechanism, while the input pulley may comprise a pulley collar arranged at an axial end of the output pulley facing in an opposite direction, i.e. away from the actuating mechanism. By this means, the pulley collars for guiding the belt may be distributed over the two pulleys. In return, each of the pulleys may be more compact. Further, because in this embodiment each of the pulleys only comprises one pulley collar, the assembly of the drive unit may be facilitated by allowing to axially slide the belt onto each of the pulleys, i.e. without having to lift the belt across the pulley collars.

In yet another preferred embodiment, the linear actuator comprises an output member, in particular a push tube, coupled to the actuating mechanism and a guiding element slidably mounted on the output member for bracing the output member against the housing. The guiding member may be ring-like, in particular be configured in form of a hollow cylinder. The guiding element is preferably configured to guide a sliding motion of the output member relative to the housing. To this end, the guiding element is preferably received by a corresponding cavity formed by the two housing parts. By means of the guiding element, friction can be reduced compared to assemblies where a push tube directly braces against the housing. At the same time, the spacial requirements compared to mounting the output member by means of a bearing can be significantly reduced.

In yet another preferred embodiment, the guiding element comprises a convex outer surface. Therein, the convex outer surface is preferably configured to brace against the housing. Further preferably, the two housing parts form a cavity having a radial inner surface complementary to the convex outer surface of the guiding element. By this means, the output member can be braced reliably even against non-axial loads.

In yet another preferred embodiment, each of the two housing parts comprises a rear projection, the two rear projections forming a clevis for attachment of the linear actuator. The rear projections are preferably integrated into the respective housing part, i.e. integral with the housing parts. This allows particularly fast and easy, yet secure integration, e.g. into a production line, with a minimum of additional fastening means.

Preferably, the rear projections are in symmetrical arrangement with respect to a contact plane defined by the two housing parts. This may simplify the production of the housing parts, e.g. by casting, in particular if the two housing parts are overall symmetric.

In yet another preferred embodiment, each of the two housing parts is cast from a plastic material, in particular nylon. This allows fast and cheap yet accurate production of the two housing parts. Further, a particular lightweight housing can be achieved. Alternatively, each of the two housing parts is produced from a metallic material, in particular Aluminium. This also allows for a particularly durable housing.

In yet another preferred embodiment, each of the two housing parts comprises axial through holes configured to receive fastening screws for mounting a motor to the housing, wherein each of the axial through holes houses a brace tube configured to brace a corresponding fastening screw against the housing. The axial through holes, in particular four axial screw holes, may be arranged about at least one cavity for receiving the input pulley and/or associated bearings and/or extend substantially parallel to the actuation axis of the linear actuator. The brace tubes are preferably fabricated from metal, in particular steel, for being able to reliably withstand the compressive force exerted when fastening the screws. By this means, the motor can be tightly secured even to the two housing parts fabricated e.g. from a plastic material or aluminium, without risking to damage the housing.

According to a second aspect of the invention, the housing for a linear actuator, in particular according to the first aspect of the invention, comprises two housing parts which, in an assembled state of the housing, define a contact plane in which the two housing parts are substantially in contact, wherein an actuating mechanism of the linear actuator is at least partially arranged in said housing, wherein the two housing parts are configured to receive the actuating mechanism such that an actuation axis of the actuating mechanism lies substantially parallel to the contact plane in the assembled state of the housing. The actuating mechanism preferably includes a spindle and a nut, the actuating mechanism being configured to convert rotational motion into translational motion. An output member may be coupled, in particular attached, to said nut. The housing enables a particularly easy and fast assembly of the linear actuator.

Preferably, the two housing parts of the housing according to the second aspect of the invention are configured to form, in an assembled state of the housing, a plurality of separate cavities configured to receive separate components of the linear actuator, in particular the actuating mechanism.

Preferably, each of said two housing parts comprises an assembling surface. Upon assembly of the housing, the two assembling surfaces may come into contact and define the contact plane. Preferably, each of the assembling surfaces is substantially flat. By this means, a particularly simple and accurate assembly of the linear actuator and the housing in particular is possible. Further, such housing parts can be fabricated particularly easy and fast e.g. by casting.

According to a third aspect of the invention, an actuation system comprises a linear actuator according to the first aspect of the invention and a motor coupled to the linear actuator. Preferably, the motor comprises a connecting part, by means of which the motor is secured to the housing.

In a preferred embodiment, the two housing parts form an opening receiving the connecting part of the motor including a motor shaft, wherein at least one of the two housing parts comprises a groove that at least partially runs inside the opening and receives a collar of the connecting part of the motor. The connecting part, in particular the collar, may include a web and girth, wherein the web is arranged radially about the motor shaft and the girth extends radially from the web. By this means, the motor can be hooked into the housing, providing a particular secure and simple attachment of the motor to the housing, in particular without the need of additional fastening means. In other words, the motor may be secured to the housing just by assembling the two housing parts, in particular fixing the two housing parts to each other, e.g. by means of screws reaching through axial through holes in the housing parts or welding.

Alternatively or additionally, the opening comprises at least one section rotationally fixing the connecting part of the motor with respect to the housing. For example, the opening may match a non-spherical shape of the connecting part of the motor, in particular the collar. In particular, the opening may comprise two, preferably symmetric, flats which radially support two complementary sections of the connecting part. By this means, a particular simple rotational lock can be realised, in particular without the need of additional fastening means.

In another preferred embodiment, the linear actuator of the actuation system comprises a drive unit coupling the motor to the actuation mechanism. The drive unit preferably comprises an input pulley coupled to a motor shaft of the motor, an output pulley coupled to the actuation mechanism, in particular the spindle, and a belt running on the input pulley and the output pulley.

In yet another preferred embodiment, the input pulley is directly mounted onto the motor shaft. For example, the input pulley may be force-fitted onto the motor shaft. To this end, the input pulley preferably comprises a conical bore. This allows for particular fast assembly. Alternatively, the input pulley may be latched onto the motor shaft. By this means, the motor can be coupled to the drive unit without any additional components, in particular fastening means, minimizing the rotational clearance.

In yet another preferred embodiment, the drive unit comprises a coupling interface for coupling the input pulley to the motor shaft, wherein the coupling interface may be mounted onto the motor shaft. Preferably, the input pulley sits on a conical surface of the coupling interface. Further, the input pulley may be secured on the conical surface by means of a nut. Said nut can be screwed onto a threading of the coupling interface adjacent to the conical surface. By providing a coupling interface having a conical surface, assembly of the linear actuator and the drive unit in particular becomes particularly easy.

According to a fourth aspect of the invention, the method for assembling a linear actuator, in particular according to the first aspect of the invention, comprises the following steps: (i) providing a housing, in particular according to the second aspect of the invention, comprising two housing parts; (ii) arranging an actuating mechanism in one of the two housing parts, the actuating mechanism including a spindle and a nut, the actuating mechanism being configured to convert rotational motion into translational motion; and (iii) assembling the housing such that the two housing parts form a plurality of separate cavities which receive separate components of the linear actuator, in particular the actuating mechanism.

For example, each of the two housing parts may comprise through holes being in axial alignment when the two housing parts are arranged to form the plurality of cavities. The two housing parts may then be secured by screws reaching through the through holes of both housing parts and fastened by nuts. Alternatively, one of the housing parts may comprise threaded bores. In this case, the two housing party may be secured by screws reaching through the through holes of one housing part into the threaded bores of the other housing part. In yet another alternative, the two housing parts may be welded together, in particular by means of ultrasonic welding.

The described features and advantages described with respect to the first aspect of the invention and its preferred embodiments are, if not explicitly stated otherwise and at least where technically meaningful, valid also for the second, third and fourth aspect of the invention and its preferred embodiments and vice versa.

Any other features which are considered as characteristic for the invention are set forth in the appended claims.

Although the invention is illustrated and described herein as embodied in linear actuator, housing, actuation system and assembly method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
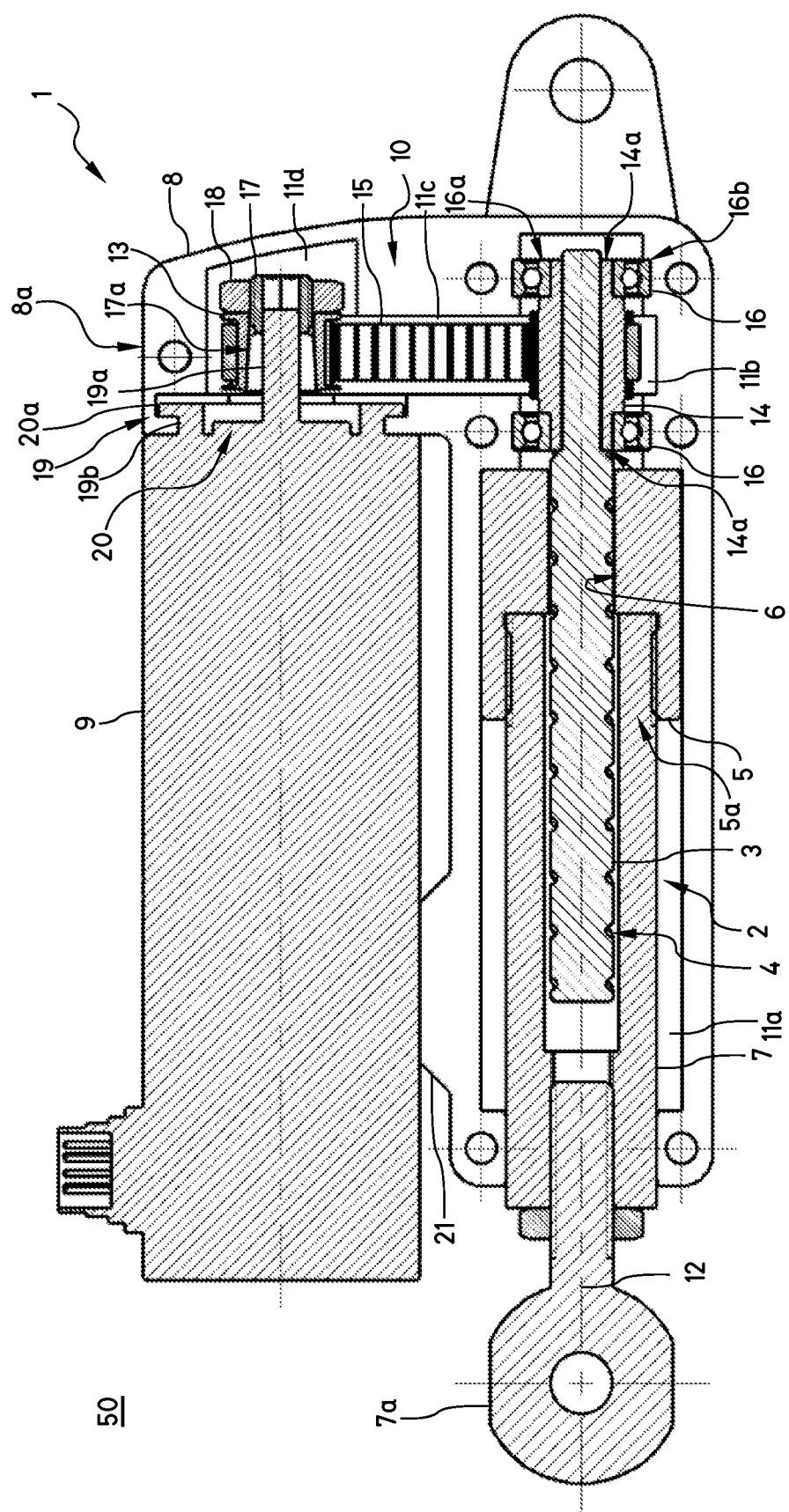
FIG. 1 an exemplary embodiment of an actuation system according to the invention in a cross-sectional view.

Referring now to the figures of the drawing in detail and first, in particular, to FIG. 1 thereof, there is shown an example of an actuation system 50 including a linear actuator 1 and a motor 9 in a cross-sectional view. The linear actuator 1 comprises an actuating mechanism 2 including a spindle 3 and a nut 5, wherein the actuating mechanism 2 is configured to transform rotational motion of the spindle 3 into translational motion of the nut 5. The linear actuator 1 further comprises an output member 7 coupled to the actuating mechanism 2, in particular to the nut 5, a housing 8, and a drive unit 10 configured to couple the motor 9 to the actuating mechanism 2, in particular the spindle 3.

In the present example, the actuating mechanism 2 is configured as a ball screw mechanism. To this end, the spindle 3 comprises a helical outer raceway 4 for guiding balls arranged in between the nut 5 and the spindle 3. On an inner surface 6, the nut 5 preferably comprises a corresponding inner raceway in order to couple a rotational motion of the spindle 3 to a translational motion of the nut 5. The nut further comprises a mechanism for recirculating the balls from a distal end of the nut 5, i.e. an end facing away from the motor 9 or the drive unit 10, respectively, to a proximal end, i.e. an end facing towards the motor 9 or the drive unit 10, respectively, and vice versa. However, in other variants the actuating mechanism 2 may be configured as a simple drive screw mechanism wherein the spindle comprises an outer threading meshing with an inner threading of the nut.

In the shown embodiment, the output member 7 is designed sleeve-like such that it can receive the spindle 3 at a proximal end. At an opposite distal end, an actuating member 7a is screwed into the sleeve-like output member 7. The output member 7 is connected to the nut 5 via an outer threading at the proximal end which meshes with a corresponding inner threading of the nut 5, the inner threading of the nut 5 being arranged in a recess 5a for receiving the proximal and of the output member 7.

The housing 8 comprises two housing parts of which only one is shown and indicated under reference numeral 8a in FIG. 1. In an assembled state, the two housing parts form a plurality of separate cavities 11a-d configured to receive separate components of the linear actuator 1, in particular of the actuating mechanism 2 and/or the drive unit 10. For example, a first cavity 11a is configured to receive the nut 5, a part of the spindle 3 and a part of the output member 7. A second cavity 11b is configured to receive another part of the spindle 3 and a part of the drive unit 10. A third cavity 11c is configured to receive another part of the drive unit 10, and a fourth cavity 11d is configured to receive yet another part of the drive unit 10. By means of the cavities 11a-d, the different components of the linear actuator 1 may be arranged in the housing 8 according to their functional relationship without any additional fastening means, in particular without any additional means securing the components to the housing 8. In other words, the different components of the linear actuator 1 may be held in place, in particular secured, by arranging them inside the cavities formed by the two housing parts upon assembly of the housing 8.

For example, an inner diameter of the first cavity 11a may correspond to an outer diameter of the nut 5 such that the nut can slide inside the first cavity 11a upon rotation of the spindle 3. The output member 7 secured to the nut 5 may thus be translated along an actuation axis 12 of the actuating mechanism 2, in particular be extended out of the housing 8 or be retracted into the housing 8.

Rotational motion is generated by the motor 9 and transmitted via a motor shaft 19a to the drive unit 10. The drive unit 10 comprises an input pulley 13 arranged in the fourth cavity 11d, an output pulley 14 arranged in the second cavity 11b and a belt 15 running on the input pulley 13 and the output pulley 14 and extending through the third cavity 11c. The output pulley 14 is press-fitted on the part of the spindle 3 extending into the second cavity 11b such that the rotational motion is transmitted onto the spindle 3.

The spindle 3 is rotationally mounted in the housing 8 via two bearings 16. Each of the two bearings 16, in particular an inner ring 16a of each bearing 16, is press-fitted onto one of two axially extending studs 14a of the output pulley 14. Corresponding outer rings 16b of each bearing 16 are received by corresponding cavities (not referenced) in the housing 8.

In the shown example, the input pulley 13 is coupled to the motor shaft 19a via a coupling interface 17. The coupling interface 17 comprises a conical surface 17a on which the input pulley 13 is press-fitted. In order to axially secure the input pulley 13, a nut 18 is screwed onto a corresponding threading of the coupling interface 17.

The motor 9 comprises a connecting part 19 for securing the motor 9 to the housing 8. The connecting part 19 includes the motor shaft 19a and a collar 19b radially arranged about the motor shaft 19a. The collar 19b meshes with a groove 20a arranged in an opening 20 formed by the two housing parts upon assembly. In order to support the motor 9 secured to the housing 8 in this manner, the housing part 8a shown in FIG. 1 comprises an outer protrusion 21 which contacts the motor 9 when the collar 19b meshes with the groove 20a.

Of course, other configurations of the linear actuator 1 are possible as well. For example, it may be conceived to design the first cavity 11a for translationally fixing the nut 5 and to couple the output pulley 14 to the nut 5 instead of the spindle 3. Accordingly, the output member 7 can be coupled to or even be formed by the spindle 3, which then may translate along the actuation axis 12 upon rotation of the nut 5.

Figure 2:
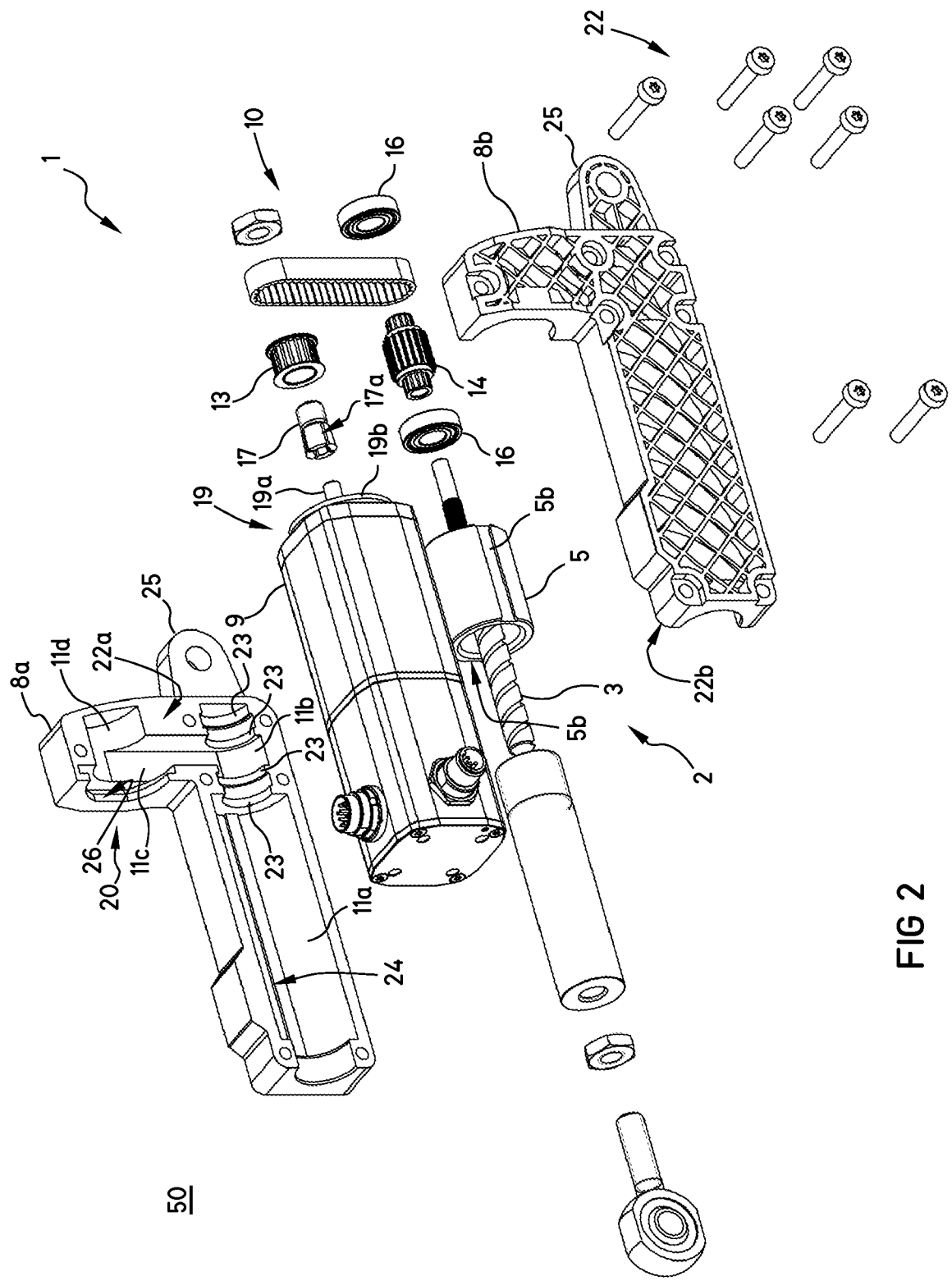
FIG. 2 shows the actuation system of FIG. 1 in an exploded view.

FIG. 2 shows the actuation system 50 from FIG. 1 in an exploded view. The actuating mechanism 2 including the threaded spindle 3 and the nut 5 is coupled to the motor 9 via the drive unit 10. The drive unit 10 as well as the actuating mechanism 2 are at least partially arranged inside the housing which comprises two housing parts 8a, 8b. In the assembled state, the two housing parts 8a, 8b may be secured to each other by a plurality of screws 22.

The two housing parts 8a, 8b preferably define a contact plane in which the two housing parts 8a, 8b are substantially in contact in an assembled state of the housing. As shown in FIG. 2, to this end each of the housing parts 8a, 8b may comprise a connecting surface 22a, 22b, wherein the two connecting surfaces 22a, 22b are in contact in the assembled state of the housing and define the contact plane. Further, the two housing parts 8a, 8b are configured to receive the actuating mechanism 2 such that the actuating axis (cf. FIG. 1) of the actuating mechanism 2 lies substantially parallel to the contact plane in the assembled state of the housing. This can be achieved by arranging separate components of the linear actuator 1, in particular of the actuating mechanism 2 and/or the drive unit 10, in the plurality of separate cavities 11a-d.

In FIG. 2, the plurality of separate cavities 11a-d can be seen particularly well. Therein, at least a part of the cavities 11a-d are separated by inner walls 23 integral with the two housing parts 8a, 8b. By this means, at least a part of the components may be substantially fixed inside the housing. For example, the bearings 16 for rotationally mounting the spindle 3 and the output pulley 14 with respect to the housing may be translationally fixed in the respective cavities (not referenced) receiving the bearings 16.

The housing parts 8a, 8b may also be configured to rotationally fix at least a part of components of the linear actuator 1. For example, each of the housing parts 8a, 8b may comprise an axially extending mating component 24 configured to interact with a corresponding mating component 5b of the nut 5. In the embodiment shown in FIG. 2, the mating components 24 of the housing parts 8a, 8b are designed as projections axially extending inside the first cavity 11a, and the corresponding mating components 5b of the nut 5 are designed as axially extending grooves in the outer surface of the nut 5.

Further, the housing parts 8a, 8b may also be configured to rotationally fix the motor 9. To this end, the opening 20 formed by the two housing parts 8a, 8b for receiving the connecting part 19 including the motor shaft 19a and the collar 19b preferably comprises a shape complementary to the circumferential shape of the collar 19b. In particular, the opening 20 may comprise two sections 26 designed as flats against which the collar 19b radially abuts with a corresponding radial surface.

In order to simplify and accelerate assembly, the conical surface 17a of the coupling interface 17 is slotted. By this means it can be easily slipped over the motor shaft 19a. By press-fitting the input pulley 13 onto the conical surface 17a, the coupling interface 17 is then secured to the motor shaft 19a.

To enable attachment of the linear actuator 1 e.g. to a component of a production line, each of the housing parts 8a, 8b comprises a rear projection 25. Both rear projections 25 form, in an assembled state of the housing, a clevis. As can be seen from FIG. 2, the clevis is thus integral with the housing.

Figure 3:
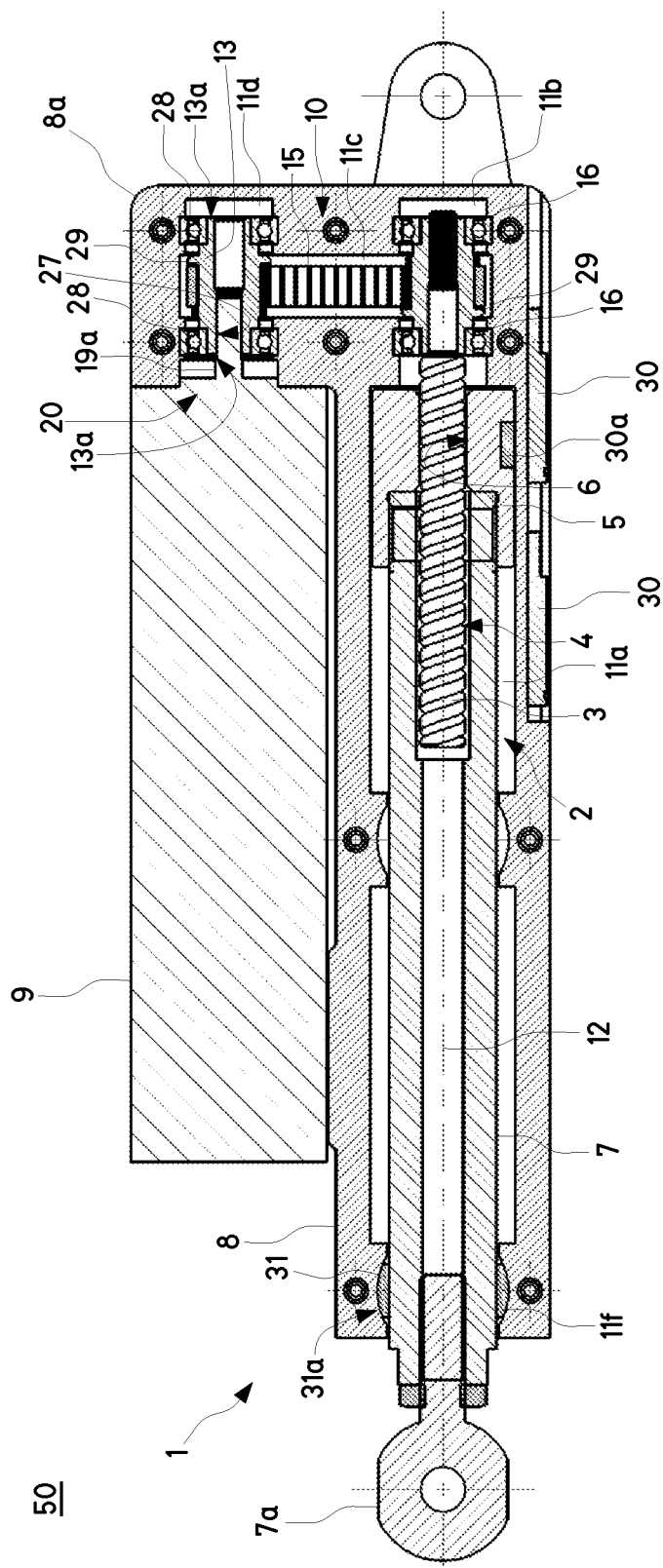
FIG. 3 is another exemplary embodiment of an actuation system in a cross-sectional view.

FIG. 3 shows another example of an actuation system 50 including a linear actuator 1 and a motor 9 in a cross-sectional view. Similar to the actuation system 50 shown in FIGS. 1 and 2, the linear actuator 1 comprises an actuating mechanism 2 including a spindle 3 having an outer raceway 4 and a nut 5 having corresponding inner raceway on an inner surface 6, wherein the actuating mechanism 2 is configured to transform rotational motion of the spindle 3 into translational motion of the nut 5. The linear actuator 1 further comprises an output member 7 coupled to the actuating mechanism 2, in particular to the nut 5, housing 8, and a drive unit 10 configured to couple the motor 9 to the actuating mechanism 2, in particular the spindle 3. Here, the housing 8 also comprises two housing parts of which only one is shown and indicated under reference numeral 8a. Upon assembly, the two housing parts form a plurality of cavities 11a-f for receiving components of the linear actuator 1, e.g. the actuation mechanism 2 or at least parts thereof, or the drive unit 10 or at least parts thereof.

The actuation system 50 shown in FIG. 3 differs from the actuation system 50 shown in FIGS. 1 and 2 in that the motor 9 is not fixed to the linear actuator 1, in particular the housing 8, by means of a connecting part interacting with an opening formed by the two housing parts. Rather, the motor 9 is fixed to the housing 8 by means of screws (not shown) extending through axial through holes (not shown) substantially parallel to an actuation axis 12 in a back region of the housing (cf. FIG. 4).

Further, instead of utilizing a coupling interface, a motor shaft 19a of the motor 9 is inserted into an axial bore 27 in an input pulley 13 of the drive unit 10 in a form-fit manner. Preferably, the input pulley 13 is rotatably mounted via two additional bearings 28 in the housing 8, in particular in a corresponding fourth cavity 11d formed by the two housing parts. Thus, the input pulley 13 may substantially be supported by the housing 8 instead of the motor shaft 19a or the coupling interface, respectively. This is advantageously because now the linear actuator 1 can be assembled without integrating the motor 9. Rather, the motor 9 may be coupled to the linear actuator 1, in particular the actuation mechanism 2, at a later stage in order to form the actuation system 50. To this end, the motor 9 may be axially moved, i.e. parallel to the actuation axis 12, such that the motor shaft 19a passes through the opening 20 and is inserted into the axial bore 27 of the input pulley 13.

Similar to bearings 16 sitting on two axially extending studs 14a of an output pulley 14 of the drive unit 10 (cf. FIG. 1), the additional bearings 28, in particular an inner ring of the bearings 28, may sit on two axially extending studs 13a of the input pulley 13. In particular, the bearings 28 may be press fitted onto the axial studs 13a. Corresponding outer rings of the bearings 28 may be received by corresponding cavities (not referenced) in the housing 8.

In the example shown in FIG. 3, the input pulley 13 and the output pulley 14 each comprise only one pulley collar 29 for guiding a belt 15 running on the input pulley 13 and the upper pulley 14, in particular for axially fixing the belt 15 in a third cavity 11c of the housing 8. To this end, the pulley collars 29 are arranged at opposite ends of the two pulleys 13, 14 such that the belt 15 runs in between the two pulley collars 29. In other words, the pulley collars 29 are arranged at ends of the two pulleys 13, 14 which face in different directions. In particular, the pulley collar 29 of the output pulley 14 is arranged at an end facing towards the actuation mechanism 2, i.e. towards the front of the linear actuator 1, while the collar 29 of the input pulley 13 is arranged at an end facing away from the actuation mechanism 2, i.e. towards the back of the linear actuator 1.

Further, upon assembly, the two housing halves form at least one fifth cavity 11e for receiving end switches 30 provided for limiting the translational movement, i.e. the movement range, along the actuation axis 12 of the actuation mechanism 2, in particular the nut 5 or the output member 7, respectively. To this end, the nut 5 may comprise a switch member 30a configured to actuate the end switches 30. For example, the nut 5 may comprise a permanent magnet arranged in a groove on an outer surface of the nut 5, wherein the end switches 30 are preferably configured to sense the magnetic field of the permanent magnet when the nut 5 has moved into a position such that the permanent magnet is adjacent to the respective end switch 30. The end switches 30 may be connected to a control unit (not shown) configured to control the motor 9 based on signals generated by the end switches 30 upon sensing the magnetic field of the permanent magnet.

The actuation system 50 also differs from the actuation system shown in FIGS. 1 and 2 in that the linear actuator 1 comprises a guiding element 31 configured to guide the movement of the output member 7, in particular to translationally mount the output member 7 in the housing 8. To this end, the guiding element 31 may be slidably mounted on the output member 7 for bracing the output member 7 against the housing 8. In other words, the guiding element 31 is configured or arranged, respectively, to at least partially support the output member 7, in particular at a distal end of the linear actuator 1. In particular, the output member 7 may be supported by the guiding element 31 on the one hand, and by its coupling to the nut 5 on the other hand. To this end, the guiding element 31 is preferably received by a sixth cavity 11f at a distal end of the housing 8.

In order to brace the output member 7 against non-axial loads, for example forces acting radially on the output member 7 or an actuating element 7a coupled to the output member 7, respectively, the guiding element 31 comprises a convex outer surface 31a. Preferably, the sixth cavity 11f comprises a corresponding complementary inner surface for supporting the convex surface 31a. By this means, non-axial loads acting on the output member 7 may be reliably taken up by the housing 8, i.e. without putting strain on the nut 5 and/or the spindle 3.

Optionally, as shown in FIG. 3, the housing parts may be configured to form more than one sixth cavity 11f upon assembly. During assembly of the linear actuator 1, the guiding element 31 may then be placed in one of the sixth cavities 11f. Alternatively, more than one guiding element 31 may be played in the more than one sixth cavity 11f. By this means, depending on the intended use of the linear actuator 1, the output member 7 may be optimally supported. For example, it becomes possible to reliably support a particularly short or long output member 7.

Figure 4:
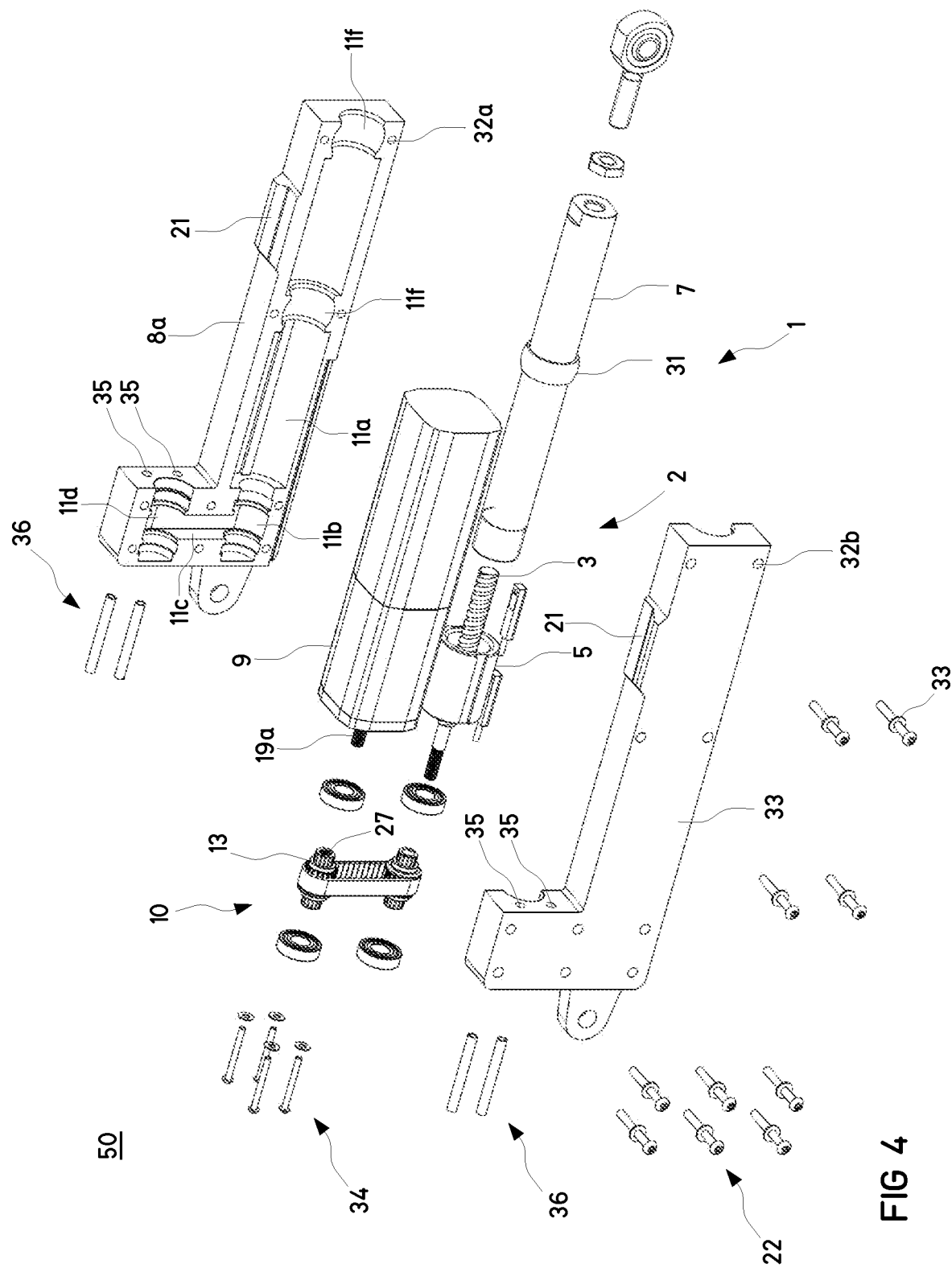
FIG. 4 shows the actuation system of FIG. 3 in an exploded view.

FIG. 4 shows the actuation system 50 from FIG. 3 in an exploded view. The actuating mechanism 2 including the threaded spindle 3 and the nut 5 is coupled to the motor 9 via the drive unit 10. The drive unit 10 as well as the actuating mechanism 2 are at least partially arranged inside the housing which comprises two housing parts 8a, 8b. To this end, the two housing parts 8a, 8b form a plurality of cavities 11a-f upon assembly, the cavities 11a-f being preferably configured to receive at least parts of the actuation mechanism 2 and the drive unit 10, respectively.

In the assembled state, the two housing parts 8a, 8b may be secured to each other by a plurality of screws 22, for example by providing threaded bores 32a in one of the two housing parts 8a and corresponding lateral through holes 32b in the other of the two housing parts 8b such that the screws 22 can reach through the lateral through holes 32b and mesh with the threading in the bores 32a. In order to brace the screws 22 against the housing part 8b, washers 33 may be provided. For reasons of clarity, only one of the threaded bores 32a, lateral through holes 32b or washers 33 is provided with a reference numeral, respectively.

Alternatively, both housing parts 8a, 8b may comprise lateral through holes 32b. The housing parts 8a, 8b may then be secured in an assembled state by nuts screwed on the screws 22 reaching through the lateral through holes 32b in both housing parts 8a, 8b. In another alternative, the housing parts 8a, 8b may be provided without any lateral through holes or bores. Instead, the housing parts 8a, 8b may be secured in an assembled state via welding, in particular ultrasonic welding.

In the example shown in FIG. 4, the motor 9 is fastened to the housing of the linear actuator 1 by means of fastening screws 34 reaching through corresponding axial through holes 35 in a back region of the housing. The axial through holes 35 are preferably arranged about a fourth cavity 11d formed upon assembly of the two housing parts 8a, 8b for receiving an input pulley 13 of the drive unit 10, thus allowing for a broad load distribution.

In order to keep the fastening screws 34 from compressing the housing, brace tubes 36 may be inserted in the axial through holes 35. The brace tubes 36 may be configured as metal tubes, in particular steel tubes. The brace tubes 36 can take up axial loads exerted by fastening the fastening screws 34 while bracing the fastening screws 34 radially against the housing, in particular the inner surface of the axial through holes 35.

Although not indicated in FIG. 4, the lateral through holes 32b may also house such brace tubes 36.

In the configuration of the linear actuator 1 shown in FIG. 4, the motor 9 may be included into the actuation system 50 after the linear actuator 1 has been assembled. In particular, the motor 9 may be placed on a protrusion 21 of the assembled housing and axially moved to insert the motor shaft 19a into the axial bore 27 of the input pulley 13 until the motor 9 abuts on the back part of the housing. The motor 9 can then be fastened to the housing via the fastening screws 34. In order to radially align the motor shaft 19a with the axial bore 27, the protrusion 21 may be adapted to the shape of the motor 9, in particular to the circumferential shape, as can be seen in FIG. 4.

The two housing parts 8a, 8b are further configured to form upon assembly at least one sixth cavity 11f for receiving the guiding element 31 slidably mounted on the output element 7. In the shown example, the housing parts 8a, 8b form two sixth cavities 11f. Upon assembly of the linear actuator 1, depending on intended use, it can be chosen in which of the cavities 11f the guiding element 31 shall be arranged.

Figure 5:
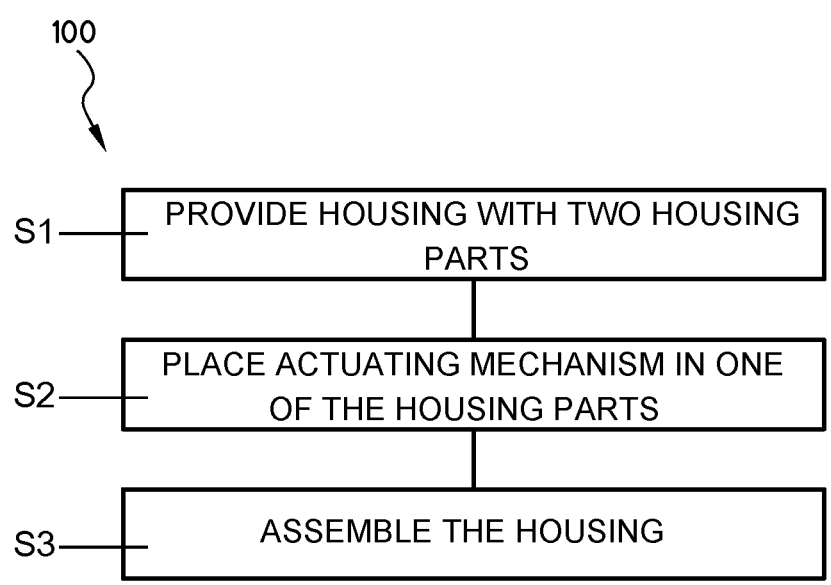
FIG. 5 is an exemplary embodiment of a method for assembling a linear actuator.

FIG. 5 shows a flow diagram of an example of a method 100 for assembling a linear actuator. In a method step S1, a housing comprising two housing parts is provided. To this end, each of the two housing parts may be cast from a plastic material, such as nylon. Alternatively, each of the two housing parts may be fabricated from a metallic material, such as aluminium. Preferably, each of the two housing parts comprises inner walls defining a plurality of separate cavities for receiving separate parts of the linear actuator upon assembly of the housing. The inner walls are preferably formed upon casting the two housing parts; by way of example, they are fabricated integral (in one piece) with the housing parts.

In a further method step S2, an actuating mechanism including a spindle and a nut is arranged in one of the two housing parts. Preferably, further components of the linear actuator are also arranged in the one housing part. In particular, the separate components of the linear actuator are placed such that they are received by the plurality of separate cavities upon assembly of the housing.

After the components have been arranged in the one housing part, the housing is assembled in further method step S3. Thereby, the plurality of separate cavities at least partially enclosing the separate components of the linear actuator are formed.

Preferably, the two housing parts are fabricated in method step S1 such that upon assembly in method step S3, the two housing parts are defining a contact plane in which the two housing parts come in contact. Further, the two housing parts are preferably fabricated such that by arranging the actuating mechanism, preferably also other components of the linear actuator, such as, for example, components of a drive unit, inside the plurality of cavities, an actuation axis of the actuating mechanism lies substantially parallel to the contact plane.

The following is a summary list of reference numerals and the corresponding structure used in the above description of the invention:
1 linear actuator
2 actuating mechanism
3 spindle
4 outer raceway
5 nut
5a recess
5b mating component
6 inner surface
7 output member
7a actuating member
8 housing
8a, 8b housing part
9 motor
10 drive unit
11a-f cavity
12 actuation axis
13 input pulley
13a stud
14 output pulley
14a stud
15 belt
16 bearing
16a, 16b inner ring, outer ring
17 coupling interface
17a conical surface
18 nut
19 connecting part
19a motor shaft
19b collar
20 opening
20a groove
21 protrusion
22 screw
22a, 22b connecting surface
23 inner wall
24 mating component
25 rear projection
26 section
27 axial bore
28 additional bearing
29 pulley collar
30 end switch
30a switch member
31 guiding element
31a convex outer surface
32a threaded bore
32b lateral through hole
33 washer
34 fastening screws
35 axial through hole
36 brace tube
100 method
S1-S3 method step

The invention claimed is:

1. A linear actuator, comprising:
a housing formed with two housing parts, said two housing parts forming a plurality of separate cavities configured to receive separate components of the linear actuator;
an actuating mechanism at least partially arranged in said housing, said actuating mechanism including a spindle and a nut and being configured to convert a rotational motion into a translational motion; and
wherein said two housing parts are formed with inner walls separating at least a part of said plurality of separate cavities.

2. The linear actuator according to claim 1, wherein at least a part of said inner walls is configured to translationally fix the components of the linear actuator received by the respective said cavity.

3. The linear actuator according to claim 1, wherein at least one of said two housing parts comprises a mating component extending in an axial direction configured to interact with a corresponding mating component of said nut and to rotationally fix said nut.

4. The linear actuator according to claim 1, wherein at least one of said two housing parts comprises an outer protrusion for supporting a motor coupled to said actuating mechanism.

5. The linear actuator according to claim 1, further comprising:
a drive unit for coupling a motor to said actuating mechanism, said drive unit including an input pulley engageable by a motor shaft of the motor, an output pulley coupled to said spindle, and a belt running on said input pulley and said output pulley;
wherein at least one of said input pulley or said output pulley has two axially extending studs, and a bearing is press-fitted onto each of said two axially extending studs for rotatably mounting said input pulley or said output pulley and said spindle, respectively, in said housing.

6. The linear actuator according to claim 5, wherein at least one or both of said input pulley or said output pulley comprises a plurality of ribs extending axially on a circumferential surface of each of said two axially extending studs.

7. The linear actuator according to claim 1, further comprising a drive unit for coupling a motor to said actuating mechanism, said drive unit including an input pulley engageable by a motor shaft of a motor, an output pulley press-fitted onto said spindle, and a belt running on said input pulley and said output pulley.

8. The linear actuator according to claim 1, further comprising a drive unit for coupling a motor to said actuating mechanism, said drive unit including an input pulley engageable by a motor shaft of the motor, an output pulley coupled to said spindle, and a belt running on said input pulley and said output pulley, wherein each of said input pulley and said output pulley has a pulley collar for guiding said belt, said pulley collars being arranged at opposite ends of said input and output pulleys.

9. The linear actuator according to claim 1, further comprising an output member and a guiding element slidably mounted on said output member for bracing said output member against said housing.

10. The linear actuator according to claim 9, wherein said guiding element is formed with a convex outer surface.

11. The linear actuator according to claim 1, wherein each of said two housing parts comprises a rear projection, said rear projections forming a clevis for attachment of the linear actuator.

12. The linear actuator according to claim 1, wherein each of said two housing parts is cast from a plastic material.

13. The linear actuator according to claim 1, wherein each of said two housing parts is formed with axial through holes configured to receive fastening screws for mounting a motor to said housing, each of said axial through holes housing a brace tube configured to brace a corresponding fastening screw against said housing.

14. A housing for a linear actuator according to claim 1, the housing comprising:
two housing parts which, in an assembled state of the housing, define a contact plane at which said two housing parts are primarily in contact with one another;
said two housing parts being configured to receive the actuating mechanism of the linear actuator with an actuation axis of the actuating mechanism lying substantially parallel to said contact plane in the assembled state of the housing.

15. An actuation system, comprising:
the linear actuator according to claim 1; and
a motor coupled to said linear actuator.

16. The actuation system according to claim 15, wherein said motor has a connecting part with a motor shaft and a collar, said two housing parts form an opening receiving said connecting part of said motor, at least one of said two housing parts is formed with a groove that at least partially runs inside said opening and receives said collar of said connecting part of said motor.

17. The actuation system according to claim 15, wherein said two housing parts form an opening receiving a connecting part of said motor including a motor shaft, said opening including at least one section rotationally fixing said connecting part of said motor with respect to said housing.

18. The actuation system according to claim 15, wherein said linear actuator comprises a drive unit coupling said motor to said actuating mechanism, said drive unit including an input pulley directly mounted onto a motor shaft of said motor, an output pulley coupled to said actuating mechanism, and a belt running on said input pulley and said output pulley.

19. The actuation system according to claim 15, wherein said motor has an output shaft and a coupling interface mounted onto said motor shaft, and further comprising a drive unit coupling said motor to the actuating mechanism, said drive unit including an input pulley coupled to said motor shaft of said motor, an output pulley coupled to the actuating mechanism, and a belt running on said input pulley and said output pulley, and wherein said input pulley sits on a conical surface of said coupling interface.

20. A method for assembling the linear actuator according to claim 1, the method comprising:
(S1) providing a housing with two housing parts, the housing parts being formed with inner walls;
(S2) arranging an actuating mechanism in one of said two housing parts, the actuating mechanism including a spindle and a nut and the actuating mechanism being configured to convert rotational motion into translational motion; and
(S3) assembling the housing with the two housing parts forming a plurality of separate cavities, at least partly separated by the inner walls, which receive separate components of the actuating mechanism.

* * * * *